United States Patent
Stich et al.

(10) Patent No.: US 12,533,028 B2
(45) Date of Patent: Jan. 27, 2026

(54) PREPARING AN MR ELASTOGRAPHY WITH AN MR ELASTOGRAPHY APPARATUS

(71) Applicant: Siemens Healthineers AG, Forchheim (DE)

(72) Inventors: Manuel Stich, Schwandorf (DE); Julian Richter, Hessdorf (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 19/095,115

(22) Filed: Mar. 31, 2025

(65) Prior Publication Data
US 2025/0302304 A1    Oct. 2, 2025

(30) Foreign Application Priority Data
Apr. 2, 2024   (DE) ..................... 10 2024 203 016.3

(51) Int. Cl.
*A61B 5/05* (2021.01)
*A61B 5/00* (2006.01)
(Continued)

(52) U.S. Cl.
CPC ............ *A61B 5/004* (2013.01); *A61B 5/0051* (2013.01); *A61B 5/055* (2013.01); *A61B 5/704* (2013.01);
(Continued)

(58) Field of Classification Search
CPC ....... A61B 5/004; A61B 5/0051; A61B 5/055; A61B 5/704; A61B 5/7425;
(Continued)

(56) References Cited

U.S. PATENT DOCUMENTS

| 7,034,534 B2 | 4/2006 | Ehman et al. |
| 2006/0153454 A1 | 7/2006 | Grimme |

(Continued)

FOREIGN PATENT DOCUMENTS

DE   102005001325 A1   7/2006

OTHER PUBLICATIONS

Nanjappa M, et. al.: "Magnetic Resonance Elastography of the Liver: Best Practices", Magnetom Flash (80) Jan. 2022.
(Continued)

*Primary Examiner* — Joel F Brutus
(74) *Attorney, Agent, or Firm* — Banner & Witcoff, Ltd.

(57) ABSTRACT

Techniques are disclosed for preparing an MR elastography of a liver, which includes creating a photographic recording of an examination object, determining a position of the liver on the basis of the photographic recording, providing an information item regarding a target position of an oscillation generator on the basis of the position of the liver, arranging the oscillation generator on the examination object dependent upon the information regarding the target position, introducing the examination object with the oscillation generator into a patient receiving region of a magnetic resonance device, capturing overview MR image data from the examination object, and selecting an examination region for transverse slices covering at least one subregion of the liver for a recording of MRE image data on the basis of the overview MR image data.

14 Claims, 5 Drawing Sheets

(51) Int. Cl.
    *A61B 5/055*     (2006.01)
    *A61B 90/00*     (2016.01)
    *G06T 7/00*     (2017.01)

(52) U.S. Cl.
    CPC ............ *A61B 5/7425* (2013.01); *A61B 90/39* (2016.02); *G06T 7/0012* (2013.01); *A61B 2090/3945* (2016.02); *G06T 2207/10004* (2013.01); *G06T 2207/10088* (2013.01); *G06T 2207/20081* (2013.01); *G06T 2207/30056* (2013.01)

(58) Field of Classification Search
    CPC ... G06T 2207/1004; G06T 2207/10088; G06T 2207/20081
    See application file for complete search history.

(56) References Cited

U.S. PATENT DOCUMENTS

| | | | | |
|---|---|---|---|---|
| 2011/0006767 | A1* | 1/2011 | Sack | A61B 5/0051 324/309 |
| 2014/0350395 | A1* | 11/2014 | Shachaf | H04N 23/673 600/431 |
| 2020/0015925 | A1* | 1/2020 | Scheib | A61B 1/07 |
| 2021/0287363 | A1* | 9/2021 | Bhatia | A61B 90/36 |
| 2023/0305090 | A1 | 9/2023 | Darwish et al. | |
| 2024/0090823 | A1 | 3/2024 | Sadeghi et al. | |

OTHER PUBLICATIONS

Muthupillai, R. et al.: "Magnetic Resonance Elastography By Direct Visualization Of Propagating Acoustic Strain Waves", Science Sep. 29, 1995: 1854-1857.

Ophir J. et al.: "Elastography: a Quantitative Method For Imaging The Elasticity Of Biological Tissues", Ultrason Imaging, 1991. 13(2): p. 111-34.

Lewa, G.J.: Elastic Properties Imaging by Periodical Displacement NMR Measurements (EPMRI). Proceedings of the Ultrasonics Symposium IEEE, 1994 2: p. 691-694.

Sinkus, R., et al.: "High-Resolution Tensor MR Elastography For Breast Tumour Detection", Phys Med Biol, 2000. 45 (6): p. 1649-64.

QIBA Profile for Magnetic Resonance Elastography of the Liver, 2018, RSNA, USA.

Sinkus, R. et al.: "Rheological Determinants For Simultaneous Staging Of Hepatic Fibrosis And Inflammation In Patients With Chronic Liver Disease", NMR in Biomedicine 2018; 31:e3956.

Allen, A.M. et al.:"The Role of Three-Dimensional Magnetic Resonance Elastography in the Diagnosis of Nonalcoholic Steatohepatitis in Obese Patients Undergoing Bariatric Surgery", Hepatology, 2020. 71(2): p. 510-521.

* cited by examiner

PREPARING AN MR ELASTOGRAPHY WITH AN MR ELASTOGRAPHY APPARATUS

CROSS-REFERENCE TO RELATED APPLICATIONS

The present application claims priority to and the benefit of Germany patent application no. DE 10 2024 203 016.3, filed on Apr. 2, 2024, the contents of which are incorporated herein by reference in their entirety.

TECHNICAL FIELD

The disclosure relates to a method and an MR elastography apparatus for preparing an MR elastography of a liver of an examination object.

BACKGROUND

In a magnetic resonance device, a body to be examined of an examination object, in particular that of a patient, is typically exposed to a relatively strong main magnetic field of, for example, 1.5 or 3 tesla, with the aid of a main magnet. In the context of magnetic resonance (MR) imaging, gradient pulses are applied with the aid of a gradient coil unit. In addition, by means of a radio frequency antenna unit, using suitable antenna devices, radio frequency (RF) pulses, in particular, excitation pulses, are then emitted, which has the effect that the nuclear spins of particular atoms excited into resonance by these RF pulses are tilted through a defined flip angle relative to the magnetic field lines of the main magnetic field. On relaxation of the nuclear spins, radio frequency signals known as magnetic resonance signals (MR signals) are emitted and are received by means of suitable radio frequency antennas and then further processed. From the raw data thereby acquired, the desired image data can finally be reconstructed. For a particular scan, a particular magnetic resonance control sequence (MR control sequence), which consists of a sequence of radio frequency pulses, for example excitation pulses and refocusing pulses, as well as gradient pulses to be transmitted that are suitably coordinated therewith on various gradient axes along different spatial directions, is to be transmitted. Temporally adapted thereto, readout windows are set which specify the timespans within which the induced magnetic resonance signals are captured.

In MR elastography (MRE), use is made of the fact that the phase of the magnetic resonance signals changes as a result of mechanical waves acting upon the examination object. The extent of this change depends upon the deflection (i.e. the displacement from the rest position) of the tissue as a result of the mechanical waves. Therefore, from the MR phase images, i.e. images that represent the phase of the nuclear magnetization, information regarding particular mechanical parameters of the tissue, for example, the elasticity, can be derived. MRE is therefore a non-invasive method for quantifying the elasticity and stiffness of a tissue. For the MRE, in addition to a conventional magnetic resonance device, an oscillation generator is required to generate the mechanical waves, in particular in the examination region of the examination object. The oscillation generator can comprise a flexible membrane as described, for example, in U.S. Pat. No. 7,034,534, which is excited into vibration by means of acoustic energy. The oscillation generator can be configured as described, for example, in U.S. patent application publication no. 2023/0305090A1, such as a gravitation oscillation generator.

The creation, acquisition, and/or capture of MRE image data from an examination region comprises a transmission of mechanical waves into the examination region using an oscillation generator and an MR imaging chronologically tuned thereto, on the basis of a magnetic resonance device comprising generating magnetic resonance signals in the examination region, an acquisition of corresponding raw data, and reconstruction thereof to image data, wherein such image data is designated MRE image data.

MRE of the liver is relevant, in particular, for a non-invasive diagnosis of chronic liver diseases, fibroses, and inflammations. The liver typically has its maximum spatial extent approximately parallel to the transverse axis of the examination object. This region of the liver is of interest in the context of MRE, so that during MRE, it is from this region, the examination region, that MRE image data is to be acquired. This examination region is typically covered by transverse slices in the process of the MRE imaging of the liver, wherein they are to be positioned according to the position and anatomy of the liver and also surrounding organs. In addition, such an arrangement of the oscillation generator on the body surface of the examination object is to ensure that the mechanical waves generated by the oscillation generator penetrate the examination region, in particular the spatial extent of the transverse slices. Therefore, for MRE and, in particular, MRE of the liver, a matched and precise positioning of the transverse slices for the MR imaging and of the oscillation generator on the body surface are essential.

SUMMARY

It is an object of the disclosure to provide a robust method for preparing and carrying out an MRE of the liver with an MR elastography apparatus. The object is achieved in accordance with the various embodiments as discussed herein, including those described in the claims.

The method according to the disclosure for preparing an MR elastography of a liver of an examination object with an MR elastography apparatus comprising an oscillation generator and a magnetic resonance device having a patient receiving region provides the following:

creating a photographic recording of at least a part of the examination object, determining a position of the liver on the basis of the photographic recording, providing an information item regarding a target position of the oscillation generator on the basis of the position of the liver, arranging the oscillation generator on the examination object dependent upon the information regarding the target position, introducing the examination object with the oscillation generator into the patient receiving region, capturing overview MR image data from the examination object, selecting an examination region for transverse slices covering at least a subregion of the liver for a recording of MRE image data on the basis of the overview MR image data.

In the context of the photographic recording, typically at least the upper body of the examination object is captured photographically. The photographic recording typically captures the body surface of the examination object.

The determination of a position of the liver typically comprises an analysis of the body surface mapped on the photographic recording. On the basis of externally recognizable features such as joints, the shoulders, arms, and/or the position of the neck, the position of the liver can be inferred and/or estimated and/or approximated.

Providing an information item regarding a target position of the oscillation generator on the basis of the position of the liver typically comprises a determination of the information regarding the target position of the oscillation generator. The target position of the oscillation generator may e.g. correspond to the optimum position of the oscillation generator on the body surface of the examination object. The target position of the oscillation generator is typically arranged laterally on the upper body, e.g. laterally on the ribcage, wherein a transverse plane of the liver comprises an intersection with the target position of the oscillation generator. The information regarding the target position of the oscillation generator can comprise the target position of the oscillation generator per se. The information regarding the target position of the oscillation generator can comprise a position of the liver, e.g., a center point, for example in the longitudinal direction, of the liver. On the basis of the position of the liver, that is, on the basis of an information item of this type, the actual target position of the oscillation generator can be derived. For instance, the oscillation generator can be arranged on the examination object dependent upon the position of the liver.

The arrangement of the oscillation generator on the examination object dependent upon the information regarding the target position typically comprises an arrangement of the oscillation generator at the target position. Provided that the information regarding the target position indirectly comprises the target position, the arrangement of the oscillation generator on the examination object can comprise an extraction of the target position from the information regarding the target position. The arrangement of the oscillation generator on the examination object typically comprises a fixation of the oscillation generator on the body surface of the examination object, for example by means of a strap. The oscillation generator may e.g. be arranged such that it has direct contact with the skin of the examination object.

The capturing of overview MR image data typically takes place by way of acquisition by means of a magnetic resonance device. The overview MR image data typically comprises MR image data in a coronal orientation. The spatial resolution of overview MR image data is typically lower than the spatial resolution of diagnostic image data such as, for example, MRE image data.

The selection of the examination region typically comprises a selection of transverse slices. The examination region may e.g. be subdivided into transverse slices. A gap can be present between adjacent transverse slices within the examination region. Adjacent transverse slices within the examination region can adjoin one another directly.

The method steps in the context of the method according to the disclosure for preparing an MR elastography may thus be carried out before performing an MRE. For example, the examination object and the oscillation generator are positioned for the recording of MRE image data and, for this purpose, the examination region is appropriately and individually selected for the examination object. For instance, the method according to the disclosure enables an automated specification of a correct position of the oscillation generator and an automated selection of the examination region, so that a standardized preparation and execution of an MRE of the liver is enabled. In addition, typically only the actual arranging of the oscillation generator on the examination object is to be carried out manually, dependent upon a particular specification of the information provided with regard to a target position of the oscillation generator. This enables a method for providing an MRE that is robust and reduces the probability of a faulty positioning of the oscillation generator and/or of the examination region, so that the preparation of the MRE can be carried out e.g. time efficiently. For instance, the positions of the oscillation generator and the examination region can thus be well matched to each other, and individually matched to the position of the liver of the examination object. This method is independent of the experience of the medical personnel.

One embodiment of the method provides that the selection of the examination region takes account of at least one of the following properties:

exclusion of the lung from the examination region, coverage of a transverse plane of the liver with a maximum spatial extent parallel to the transverse axis of the examination object.

A transverse plane of the liver with its maximum spatial extent parallel to the transverse axis of the examination object typically comprises the maximum lateral extent of the liver. The liver is typically arranged in the distal direction, e.g., below the lung.

The examination region may e.g. be a cuboid-shaped region distal to the lung. The examination region may be selected in such a way that the lung is situated outside the examination region. This is advantageous for a subsequent recording of MR signals, e.g. MRE signals, since the air and thus the lacking tissue within the lung impairs a quality of the MR signals by reason of the susceptibility. An exclusion of the lung from the examination region reduces artifacts in the MRE image data. In addition, the position of the transverse plane provides comprehensive information regarding the elasticity of the entire organ.

One embodiment of the method provides that the selection of the examination region takes place on the basis of landmarks.

The landmarks may e.g. comprise at least one of the following segments of the liver and/or positions within the liver: liver dome, right lobe, left lobe, lateral segment, quadrate lobe, caudate lobe, anterior segment, posterior segment, etc. The landmarks can also comprise features of other organs such as, for example, a position and/or location of the lung. Alternatively or in addition to the landmarks, a segmentation of the liver can be taken into account in the selection of the examination region. The selection of the examination region can comprise a segmentation of the overview MR image data with regard to the liver, wherein the segmented liver can be taken into account in the selection of the examination region. Such a selection of the examination region is readily capable of being automated and can be carried out robustly and repeatably by an algorithm.

One embodiment of the method provides that the selection of the examination region takes place making use of a first trained function. This embodiment typically comprises the provision of the first trained function. The first trained function can comprise, for example, a neural network and/or a U-net and/or a convolutional neural network. The first trained function can be configured to identify landmarks and/or organs and/or a position of the arranged oscillation generator in the overview MR image data and to determine an optimum position and spatial extent of the examination region and/or a position, orientation, thickness, and/or number of transverse slices. The first trained function may be applied to the overview MR image data. The first trained function can optionally be configured to take account of the photographic recording. The examination region and/or the transverse slices may be output according to this embodiment as the result of the first trained function. Such a selection of the examination region is readily capable of being automated and can be carried out individually for each examination object.

One embodiment of the method additionally comprises a provision of a patient model,
  wherein the determination of the position of the liver takes place while taking account of the patient model.

The patient model typically comprises at least a correlation between a photographic recording of an examination object, e.g. the body surface thereof, and a position, and/or location, and/or spatial extent of the liver. The patient model can also comprise a position, and/or location, and/or spatial extent of further organs. For example, the patient model can comprise a correlation between external features, e.g. externally recognizable features on photographic recordings, such as, for example, a position of the neck, shoulder, hip, and/or hands and a position and/or location and/or spatial extent of the liver. The patient model can be created and/or provided using a third trained function. For instance, an artificial neural network can have been used for creating the patient model. Such a determination of the position of the liver takes account of individual properties of the examination object, e.g. on the basis of the photographic recording, and is readily capable of being automated and can be carried out robustly and repeatably by an algorithm.

One embodiment of the method additionally comprises a provision of a second trained function,
  wherein the determination of the position of the liver takes place using the second trained function. The second trained function typically comprises a correlation between a position and/or a location and/or a spatial extent of the liver and a photographic recording of an examination object. For example, the second trained function can be implemented combined and/or integrated with the patient model. The second trained function can comprise, for example, a neural network and/or a U-net and/or a convolutional neural network. Such a determination of the position of the liver takes account of individual properties of the examination object, e.g. on the basis of the photographic recording, and is readily capable of being automated and can be carried out precisely by an algorithm.

One embodiment of the disclosure provides that the magnetic resonance device comprises a marking apparatus and a patient positioning apparatus for supporting a positioning of the examination object in the patient receiving region,
  the examination object is arranged on the patient positioning apparatus at least partially outside the patient receiving region during the photographic recording,
  and the provision of the information item regarding a target position of the oscillation generator comprises a visualization of the position of the liver and/or the target position of the oscillation generator by marking the position of the liver and/or the target position of the oscillation generator on the body surface of the examination object by means of a marking apparatus.

The marking apparatus can comprise a laser. The marking apparatus can be configured for an optical marking, e.g. by means of a photon beam, of the position of the liver on the body surface. The marking apparatus can be configured for marking the center point of the liver and/or the center of the liver along the longitudinal axis of the body of the examination object. The patient positioning apparatus can be configured to displace the examination object along the longitudinal axis of the magnetic resonance device in the context of marking the position of the liver on the body surface. For instance, if the marking apparatus is typically used in the context of the isocentric positioning of the examination object, it can only be configured for a vertical marking. The patient positioning apparatus can carry out a horizontal displacement of the examination object along the longitudinal axis of the magnetic resonance device in the horizontal direction and is therefore configured, together with the marking apparatus, for marking the position of the liver.

The coordinate of the longitudinal axis of the position of the liver typically corresponds to the coordinate of the longitudinal axis of the target position of the oscillation generator. The coordinate of the transverse axis of the target position of the oscillation generator is typically determined by the lateral extent of the ribcage. In an embodiment, the target position of the oscillation generator is arranged laterally on the ribcage at the height of the liver, typically on the side of the ribcage facing the right lobe of the liver. This target position of the oscillation generator is definitively identifiable by medical personnel when marking the position of the liver, so that the oscillation generator can be definitively arranged at its target position. This embodiment of the method may use a marking apparatus that is typically available on the magnetic resonance device for other purposes for marking the position of the liver and thus for providing the information with regard to a target position of the oscillation generator.

One embodiment of the method provides that the creation of the photographic recording takes place by means of a 3D camera. Photographic recordings captured by means of the 3D camera have a spatial impression and can enable the determination of a depth map. A 3D camera can therefore capture a surface in a plastic manner so that the body surface of the examination object can be determined particularly precisely. On the basis of a photographic recording of this type, according to the disclosure, the position of the liver can be determined particularly precisely.

One embodiment of the method provides that the creation of the photographic recording takes place in a time-resolved manner. For instance, a camera configured as a video camera, e.g. a 3D camera configured as a video camera, enables a time-resolved recording of the examination object. The arrangement of the oscillation generator on the examination object dependent upon the information regarding the target position may take place, according to this embodiment, at least partially simultaneously with a time-resolved photographic recording of the examination object. This enables a continuous monitoring and a continuous comparison of the current position of the oscillation generator during the arrangement at the target position with the provided target position of the oscillation generator. This reduces the probability of an incorrect positioning of the oscillation generator in the context of the method according to the disclosure.

One embodiment of the method provides that the magnetic resonance device comprises a display unit,
  and the provision of the information regarding a target position of the oscillation generator comprises a representation of the photographic recording and a representation of the target position of the oscillation generator on the display unit.

The display unit typically comprises a monitor and/or a display. The photographic recording may e.g. be displayed instantaneously upon its creation on the display unit and/or with a delay of less than 5 seconds. The photographic recording may be e.g. captured in a time-resolved manner and is displayed continuously on the display unit. The target position of the oscillation generator may be e.g. displayed overlaid on the photographic recording. In an embodiment, the provision of the information concerning a target position of the oscillation generator takes place while the examination object is positioned upon the patient positioning apparatus and, with said patient positioning apparatus, the examination object is introduced into the patient receiving region of the magnetic resonance device, typically without any active movement of the examination object. This embodiment enables continuous monitoring of the process of arranging the oscillation generator at the target position specified for the oscillation generator by way of a visual representation of the oscillation generator and the target position specified for the oscillation generator on the display unit. This embodiment enables continuous feedback to the medical personnel who undertake the arrangement of the oscillation generator on the examination object regarding the position of the oscillation generator, so that the necessity for a repositioning of the oscillation generator and/or an acquisition of faulty MRE image data are avoidable.

One embodiment of the method provides that the representation of the photographic recording comprises a visualization in at least two viewing directions, e.g. two views. The display unit can be segmented and/or subdivided so that the target position for the oscillation generator can be represented in two views and a navigation for the positioning of the oscillation generator is better supported. For instance, the display unit can visualize a frontal and lateral view of the examination object and the target position of the oscillation generator. This enables a particularly precise positioning of the oscillation generator.

One embodiment of the method additionally comprises:
  a determination of a comparison result by analysis of the overview MR image data regarding a position of the oscillation generator relative to the liver, and
  an output of a notification regarding repositioning of the oscillation generator dependent upon the comparison result.

The recording of the overview MR image data takes place according to the disclosure after the arrangement of the oscillation generator at its target position. The oscillation generator may e.g. be configured such that the oscillation generator emits MR signals is recognizable in image data, e.g. in overview MR image data, at least to an algorithm and/or visually. Analysis of the overview MR image data regarding a position of the oscillation generator relative to the liver typically comprises a determination of a position of the oscillation generator and a position of the liver in the overview MR image data. For instance, on the basis of the position of the liver extracted from the overview MR image data, an updated target position of the oscillation generator can be determined and this can be compared with the position of the oscillation generator. In the event of deviations, e.g. deviations larger than a threshold value, the notification regarding a repositioning can comprise a request for repositioning of the oscillation generator. This enables a repositioning of the oscillation generator before the actual MRE is performed, e.g. before the recording of the MRE image data.

One embodiment of the method provides that:
  the determination of the comparison result comprises a determination of a difference in a position of the oscillation generator and a position of the liver in the longitudinal direction, and
  the output of the notification comprises a length indication for a displacement of the oscillation generator in the longitudinal direction.

According to this embodiment, the comparison result comprises a difference in the positions of the oscillation generator and the liver in the longitudinal direction. The output of a notification typically comprises a provision of the difference, optionally dependent upon a threshold value. The notification regarding a repositioning can comprise an indication of an offset by which the oscillation generator is to be displaced in the longitudinal direction. Medical personnel can reposition the oscillation generator according to the indicated offset. This enables a particularly precise repositioning.

One embodiment of the method additionally comprises carrying out the MR elastography by means of the MR elastography apparatus comprising a recording of MRE image data of the examination region and a temporally matched actuation of the oscillation generator. For this purpose, the magnetic resonance device is typically actuated in accordance with an MR control sequence and, synchronously therewith, the examination region is subjected to mechanical waves and/or vibrations that are generated by means of an oscillation generator. An oscillation generator positioned according to the disclosure enables a particularly homogeneous penetration of the selected examination region, which covers the relevant regions of the liver. MRE image data recorded in this way is particularly informative diagnostically.

Furthermore, the disclosure proceeds from an MR elastography apparatus comprising:
  an oscillation generator configured for generating mechanical waves,
  a magnetic resonance device configured for capturing overview MR image data and MRE image data,
  a camera configured for creating a photographic recording,
  a determining unit configured for determining a position of a liver on the basis of the photographic recording, and
  a providing unit for providing an information item regarding a target position of an oscillation generator, e.g. on the basis of the position of the liver,
  a selecting unit configured for selecting an examination region.

The MR elastography apparatus according to the disclosure is thus configured for carrying out a method according to the disclosure.

The determining unit, the providing unit and the selecting unit can be configured as part of a control unit and/or together can be designated the control unit. The determining unit, the providing unit and the selecting unit can be configured at least partially separate from one another and/or separate from a control unit.

The control unit typically has an input, a processor unit and an output.

The determining unit, the providing unit, and/or the selecting unit typically each have an input, a processor unit and an output and/or can have a connection to the input, to the processor unit and/or to the output of the control unit.

Thus, a photographic recording can be provided to the determining unit and the position of the liver can be output by it. The providing unit may e.g. be configured for establishing and providing an information item regarding a target position of an oscillation generator on the basis of the position of the liver. The selecting unit is typically configured for providing the selected examination region. Via the input, further functions, algorithms or parameters that are needed can be provided to the control unit and/or the determining unit and/or the selecting unit and/or the providing unit.

The control unit and/or the determining unit and/or the selecting unit and/or the providing unit can be integrated into the MR elastography apparatus. The control unit and/or the determining unit and/or the selecting unit and/or the providing unit can also be installed separately from the MR elastography apparatus. The control unit and/or the determining unit and/or the selecting unit and/or the providing unit can be connected to the MR elastography apparatus.

Embodiments of the MR elastography apparatus according to the disclosure are configured similarly to the embodiments of the method according to the disclosure. The MR elastography apparatus can have further control components which are necessary and/or advantageous for carrying out a method according to the disclosure. The MR elastography apparatus can also be configured to transmit control signals and/or to receive and/or process control signals in order to carry out a method according to the disclosure. In a memory storage unit of the control unit, computer programs and other software can be stored, by means of which the processor unit of the control unit automatically controls and/or carries out a method sequence of a method according to the disclosure.

A computer program product according to the disclosure can be loaded directly into a memory storage unit of a programmable control unit and has program code means in order to carry out a method according to the disclosure when the computer program product is executed in the control unit. In this way, the method according to the disclosure can be carried out rapidly, exactly reproducibly and robustly. The computer program product is configured such that it can carry out the method steps according to the disclosure by means of the control unit. The control unit must have the respective pre-conditions such as, for example, a suitable working memory store, a suitable graphics card or a suitable logic unit so that the respective method steps can be carried out efficiently. The computer program product is stored, for example, on an electronically readable medium or is deposited on a network or server from where it can be loaded into the processor of a local control unit which can be directly connected to the MR elastography apparatus or configured as part of the MR elastography apparatus. Furthermore, control information of the computer program product can be stored on an electronically readable data carrier. The items of control information of the electronically readable data carrier can be configured such that they carry out a method according to the disclosure when the data carrier is used in a control unit of an MR elastography apparatus. Examples of electronically readable data carriers are a DVD, a magnetic tape or a USB stick, on which electronically readable control information, e.g. software, is stored. If this control information (software) is read from the data carrier and stored in a control unit of an MR elastography apparatus, all the embodiments according to the disclosure of the above-described methods can be carried out.

The disclosure also proceeds from an electronically readable data carrier on which a program is stored which is provided for carrying out a method according to the disclosure.

The advantages of the MR elastography apparatus according to the disclosure, the computer program product according to the disclosure and the electronically readable data carrier according to the disclosure substantially correspond to the advantages of the method according to the disclosure, as described in detail above. Features, advantages or alternative embodiments mentioned herein can also be transferred similarly to the other claimed subject matter and vice versa.

BRIEF DESCRIPTION OF THE DRAWINGS

Further advantages, features and details of the disclosure will become apparent from the description below of exemplary embodiments and from the drawings.

In the drawings.

DETAILED DESCRIPTION OF THE DISCLOSURE

Figure 1:
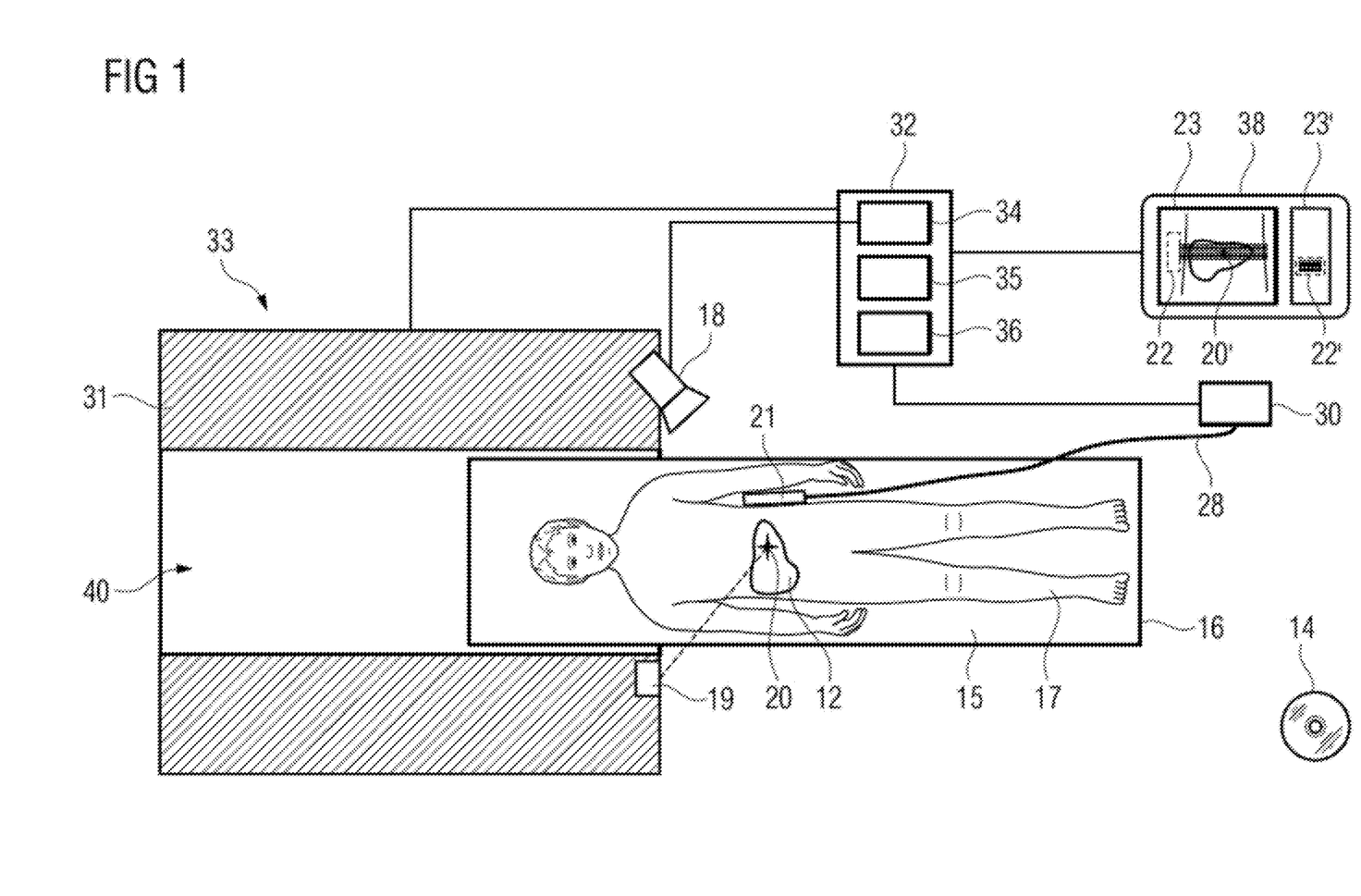
FIG. 1 illustrates a schematic representation of an example MR elastography apparatus according to the disclosure.

FIG. 1 illustrates a schematic representation of an example MR elastography apparatus according to the disclosure. The MR elastography apparatus comprises a magnetic resonance device 33. The magnetic resonance device 33 according to this embodiment comprises a hollow cylindrical detector unit 31 (also referred to herein as a detector) enclosing, e.g. concentrically surrounding, a cylindrical patient receiving region 40. The cylindrical patient receiving region 40 is configured for receiving an examination object 17. The examination object 17 can be pushed into the patient receiving region 40 by means of a patient positioning apparatus 16 of the magnetic resonance device 33. The patient positioning apparatus 16 is configured for introducing the examination object 17, e.g. with the oscillation generator 21, into the patient receiving region 40. The detector unit 31 typically comprises a main magnet (not shown in detail), a gradient coil unit (not shown in detail) and/or a radio frequency antenna unit (not shown in detail) configured for emitting excitation pulses.

For controlling the detector unit 31, the magnetic resonance device 33 has a control unit 32 (also referred to herein as a controller). The control unit 32 centrally controls the magnetic resonance device 33, for example the execution of MR control sequences and thereby the generation and capturing of MR signals. In addition, the control unit 32 comprises a reconstruction unit (also referred to herein as a reconstructor, not shown in detail) for reconstructing image data from the MR signals and/or raw data. The magnetic resonance device 33 is thus configured, dependent upon the actuation of the oscillation generator 21 and the detector unit 31, for capturing overview MR image data and MRE image data. The control unit 32 can further comprise a display (not shown in detail) and an input unit (also referred to herein as a user interface, not shown in detail). In addition, the control unit 32 can be configured for evaluating MRE image data.

The MR elastography apparatus additionally comprises an oscillation generator 21 configured for generating mechanical waves. The oscillation generator 21 is typically able to be positioned and/or fixed in a flexible manner on the examination object 17 and/or the patient positioning apparatus 16. The oscillation generator 21 can be configured as any suitable type, such as a passive oscillation generator for instance. The oscillation generator 21 is actuated and/or activated in the embodiment described by way of a vibration generator unit 30 comprising, for example, a stepper motor. For this purpose, the oscillation generator 21 is connected to the vibration generator unit 30 via a connector 28. The connector 28 can be configured as a flexible rotary feed line.

The MR elastography apparatus typically comprises a camera 18 configured for creating a photographic recording. In the case described, the camera 18 is arranged at the longitudinal end of the housing of the detector unit 31. The camera 18 can also be freely positioned in space. The camera 18 typically has a capturing region directed toward the examination object 17, wherein the camera 18 can make a photographic recording within the capturing region. The camera 18 can be configured as any suitable type of camera, such as a video camera, and thus be configured for making time-resolved photographic recordings. Alternatively and/or additionally, the camera 18 can be configured as a 3D camera for three-dimensional capture of the body surface of the examination object 17.

In the case described, the magnetic resonance device 33 optionally additionally comprises a marking apparatus 19 (also referred to herein as a marker). The marking apparatus 19 typically comprises a laser, which provides support, e.g. during positioning of the examination object 17. Thus, when positioned at least partially outside the patient receiving region 40, the examination object 17 can be placed in a position such that the region of the examination object 17 to be examined is marked by the marking apparatus 19 and is subsequently introduced automatically into an optimum position in the patient receiving region 40. The marking apparatus 19 can be used, in accordance with one embodiment of the disclosure, in the context of providing the information regarding a target position of the oscillation generator 21, for visualizing a position of the liver 12 by marking the position 20 of the liver 12 on the body surface of the examination object 17.

In the case described, the magnetic resonance device 33 optionally additionally comprises a display unit 38 (also referred to herein as a display). The display unit 38 is configured to represent the photographic recording of the examination object 17 and, at the same time, to visualize a target position 22 of the oscillation generator 21, for example by way of overlaying. For instance, the representation of the photographic recording of the examination object 17 can also comprise a marking of a position 20' of the liver 12 on the photographic recording. The display unit 38 can undertake the representation in at least one first viewing direction 23, e.g. for a first orientation. In addition, the display unit 38 can optionally visualize a representation in at least one second viewing direction 23', that is, a second orientation. The second viewing direction 23' may e.g. be arranged perpendicularly to the first viewing direction 23.

The magnetic resonance device 33 disclosed may of course comprise further components that magnetic resonance devices 33 typically have. A general functional method of a magnetic resonance device 33 is also known to a person skilled in the art, so that a detailed description of the further components is omitted.

The MR elastography apparatus comprises a determining unit 34 (also referred to herein as a determiner) configured for determining a position of a liver 12 on the basis of the photographic recording, and a providing unit 35 configured for providing an information item regarding a target position of an oscillation generator 21.

The MR elastography apparatus also comprises a selecting unit 36 (also referred to herein as a selector) configured for selecting an examination region. The determining unit 34, the providing unit 35, and the selecting unit 36 can be configured as part of the control unit 32 of the magnetic resonance device 33.

The MR elastography apparatus is thus configured for carrying out a method according to the disclosure, wherein only method step 240 comprising the arranging of the oscillation generator 21 on the examination object 17 dependent upon the information regarding the target position is to be carried out manually.

In addition, the memory storage unit 24 and, e.g. the determining unit 34, the providing unit 35, and the selecting unit 36 have computer programs and/or software which are loadable directly into a memory storage unit (not shown in detail) of the control unit 24, with program means to execute any of the methods according to the disclosure when the computer programs and/or software are executed in the control unit 24. For this purpose, the control unit 24 has a processor (not shown in detail) configured to execute the computer programs and/or software. Alternatively thereto, the computer programs and/or software can also be stored on an electronically readable data carrier 14 configured separately from the control unit 24, wherein a data access by the control unit 24 to the electronically readable data carrier 14 can take place via a data network. The MR elastography apparatus is thus configured, together with the control unit 24, to carry out a method according to the disclosure.

A method according to the disclosure may also exist in the form of a computer program product that implements the method on the control unit 24 when it is executed on the control unit 24. Similarly, an electronically readable data carrier 14 with electronically readable control information stored thereon can be provided, said control information comprising at least a computer program product such as just described and being configured so that, on use of the data carrier 14 in a control unit 24 of an MR elastography apparatus, carries out any of the methods described herein.

Figure 2:
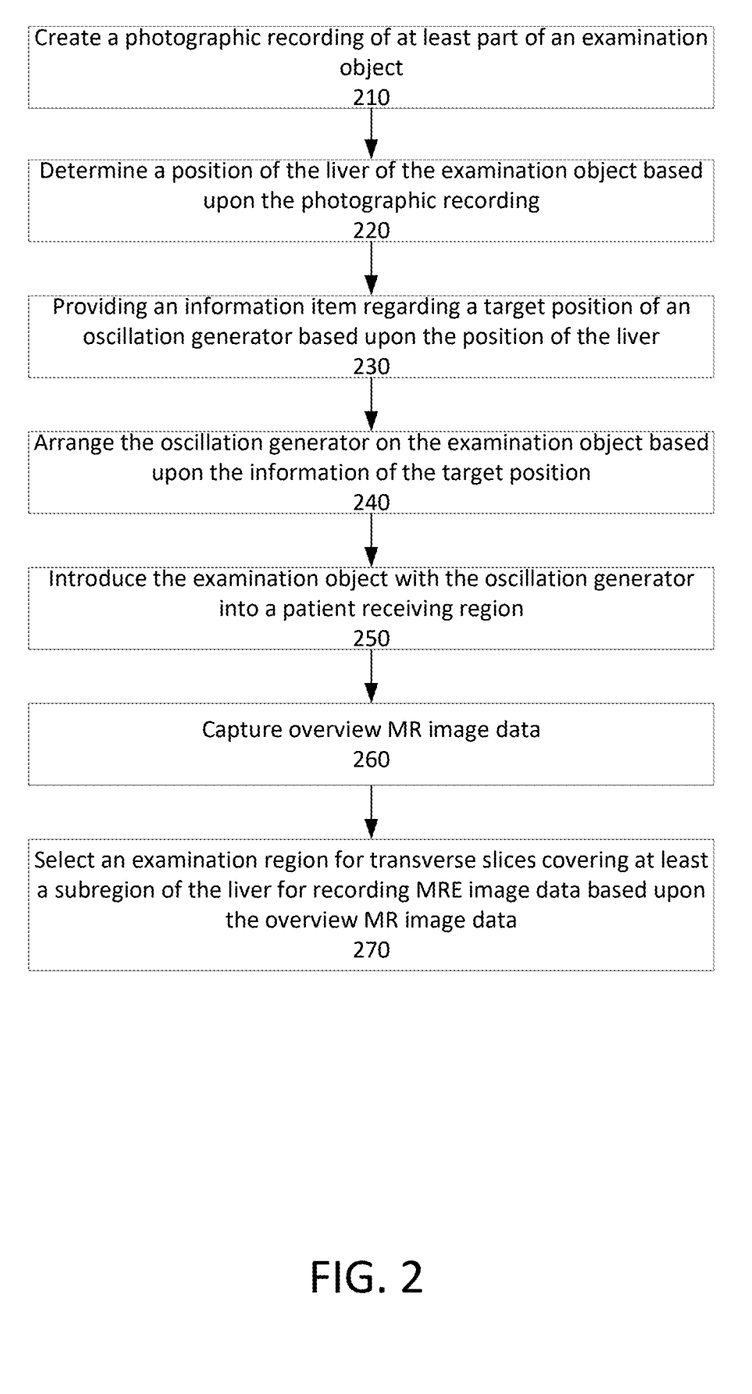
FIG. 2 illustrates a flow diagram of a first embodiment of an example method according to the disclosure.

FIG. 2 illustrates a flow diagram of a first embodiment of an example method according to the disclosure. More specifically, FIG. 2 shows a flow diagram of a first embodiment of a method according to the disclosure for preparing an MR elastography of a liver 12 of an examination object with an MR elastography apparatus, wherein the MR elastography apparatus comprises an oscillation generator 21 and a magnetic resonance device 33 having a patient receiving region 40.

With method step 210, the method provides for the creation of a photographic recording of at least a part of the examination object 17. Method step 210 is typically carried out by means of the camera 18. In method step 220, the determination of a position of the liver 12 takes place on the basis of the photographic recording. Method step 220 is typically carried out by means of the determining unit 34. Method step 230 comprises the provision of an information item regarding a target position of the oscillation generator 21 on the basis of the position of the liver 12. Method step 230 is typically carried out by means of the providing unit 35.

In the subsequent method step 240, the arranging of the oscillation generator 21 on the examination object 17 takes place dependent upon the information regarding the target position. Method step 240 is typically carried out manually by medical personnel. Method step 250 provides for the introduction of the examination object 17 with the oscillation generator 21 into the patient receiving region 40. Method step 250 is typically carried out by means of the patient positioning apparatus 16. In method step 260, the capturing of overview MR image data from the examination object 17 takes place. Method step 260 is typically carried out by the magnetic resonance device 33 and, e.g. the detector unit 31.

In the subsequent method step 270, a selection of an examination region 11 for transverse slices 10 covering at least a subregion of the liver 12 takes place for a recording of MRE image data on the basis of the overview MR image data. This method step 270 typically takes place while taking account of landmarks. Method step 270 is typically carried out by means of the selecting unit 36.

Figure 3:
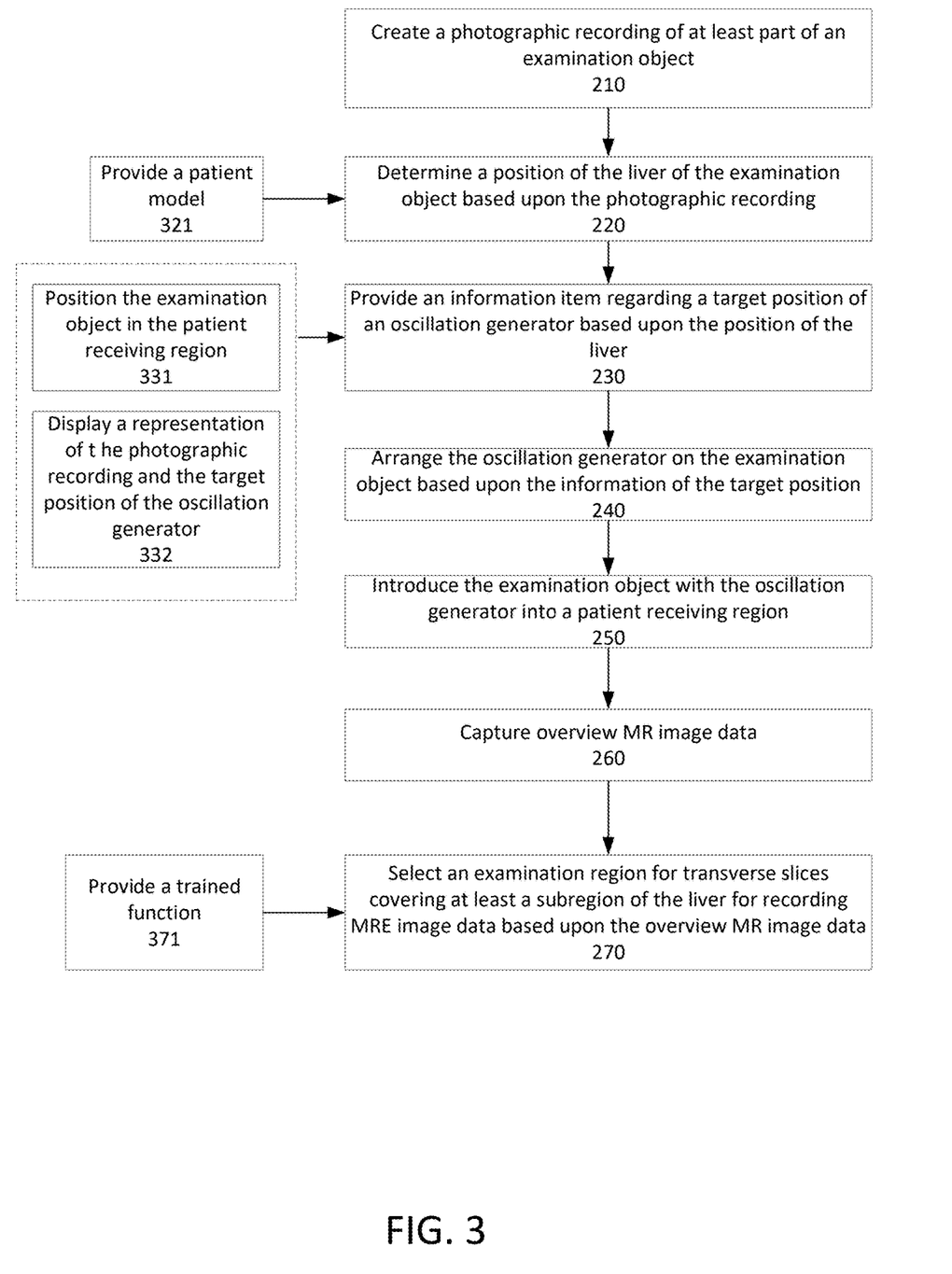
FIG. 3 illustrates a flow diagram of a second embodiment of an example method according to the disclosure.

FIG. 3 illustrates a flow diagram of a second embodiment of an example method according to the disclosure. More specifically, FIG. 3 shows a flow diagram of a second embodiment of a method according to the disclosure. The second embodiment differs from the embodiment shown in FIG. 2 in that the additional method steps 321, 331, 332, 371, wherein the additional method steps 321, 331, 332, 371 can also be carried out independently of one another.

Method step 321 comprises the provision of a patient model which is taken into account in method step 220 during the determination of the position of the liver 12. Method step 371 comprises the provision of a trained function which is taken into account in method step 270 in the selection of the examination region 11.

The provision of an information item regarding a target position of the oscillation generator 21 on the basis of the position of the liver 12 following method step 230 can take place in accordance with method step 331 and/or method step 332. Method step 331 requires a marking apparatus 19 and a patient positioning apparatus 16 to facilitate a positioning of the examination object 17 in the patient receiving region 40 and that the examination object 17 is arranged on the patient positioning apparatus 16 at least partially outside the patient receiving region 40 during the photographic recording. Method step 331 provides for the visualization of a position of the liver 12 by marking the position 20 of the liver 12 on the body surface of the examination object 17 by means of the marking apparatus 19. Method step 332 requires a display unit 38 on which, according to method step 332, a representation of the photographic recording and a representation of the target position 22 of the oscillation generator 21 takes place.

Figure 4:
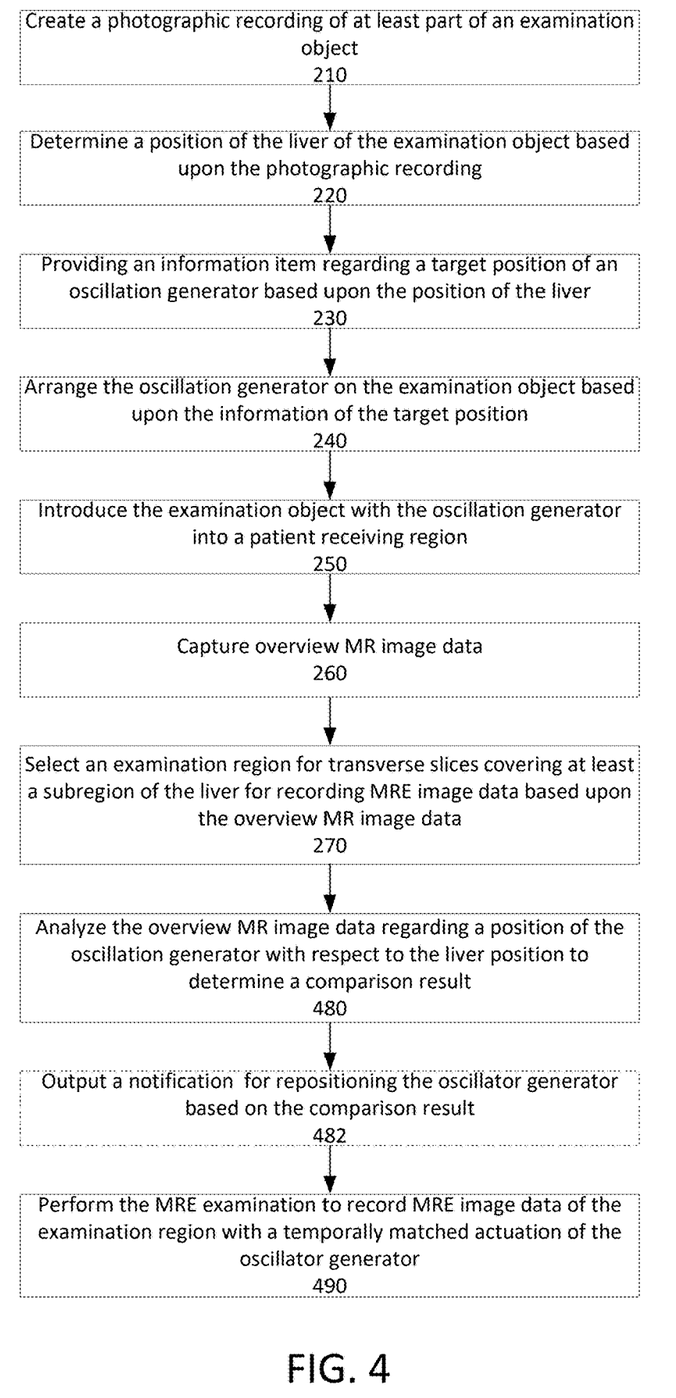
FIG. 4 illustrates a flow diagram of a third embodiment of an example method according to the disclosure.

FIG. 4 illustrates a flow diagram of a third embodiment of an example method according to the disclosure. More specifically, FIG. 4 shows a flow diagram of a third embodiment of a method according to the disclosure. The third embodiment differs from the first embodiment shown in FIG. 2, in that the additional method steps 480, 482, 490, wherein at least method step 490 can also be carried out independently of the other two. Method step 480 provides that the overview MR image data generated in method step 260 is analyzed with regard to a position of the oscillation generator 21 relative to the liver 12, wherein a comparison result is determined. This can take place, for example, by determining a difference in a position of the oscillation generator 21 and a position of the liver 12 in the overview MR image data in the longitudinal direction. Optionally, in method step 482, an output of a notification, e.g. comprising a length indication for a displacement of the oscillation generator 21 in the longitudinal direction, with regard to a repositioning of the oscillation generator 21 dependent upon the comparison result can take place. Finally, in method step 490, the MR elastography is carried out, wherein by means of the MR elastography apparatus a recording of MRE image data of the examination region 11 and a temporally matched actuation of the oscillation generator 21 take place.

Figure 5:
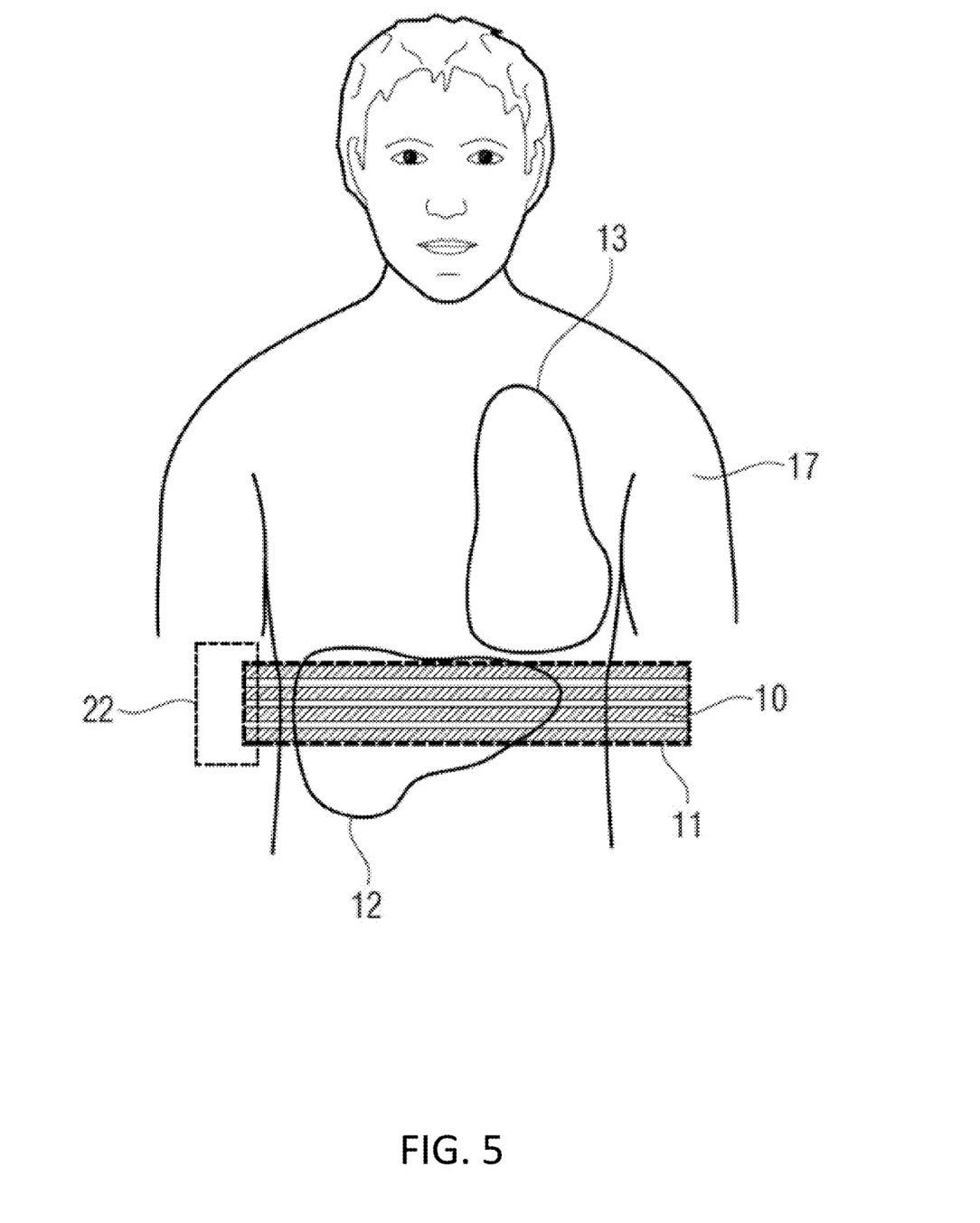
FIG. 5 illustrates a relative position of an example examination region comprising transverse slices in a schematic representation.

FIG. 5 illustrates a relative position of an example examination region comprising transverse slices in a schematic representation. More specifically, FIG. 5 shows a relative position of an examination region 11 of an examination object 17 comprising transverse slices 10 in a schematic representation. The examination region 11 is selected such that the lung 13 lies outside the examination region 11, the lung 13 is therefore not covered by the transverse slices 10. The liver 12 of the examination object 17, however, is covered by the examination region 11 at the position in the longitudinal direction of the examination object 17, at which position the liver 12 has the maximum spatial extent parallel to the transverse axis of the examination object 17. In addition, a target position 22 for the oscillation generator 21 is indicated in this drawing.

Although the disclosure has been illustrated and described in detail by way of the exemplary embodiments, the disclosure is not restricted by the examples given and other variations can be derived therefrom by a person skilled in the art without departing from the protective scope of the disclosure. Independent of the grammatical term usage, individuals with male, female or other gender identities are included within the term.

The various components described herein may be referred to as "units" or an "apparatus." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units and/or apparatuses, as applicable and relevant, may alternatively be referred to herein as "circuitry," "controllers," "processors," or "processing circuitry," or alternatively as noted herein.

What is claimed is:

1. A method for preparing a magnetic resonance elastography (MRE) of a liver of an examination object, with an MR elastography apparatus comprising an oscillation generator and a magnetic resonance device having a patient receiving region, the method comprising:
providing a patient model comprising a correlation between features externally recognizable on photographic recordings and a position and/or location and/or spatial extent of the liver;
generating a photographic recording of at least a part of an examination object;
determining a position of the liver based upon the photographic recording while using the patient model;
providing an information item regarding a target position of the oscillation generator based upon the position of the liver;

arranging the oscillation generator on the examination object based upon the information regarding the target position of the oscillation generator;

introducing the examination object with the oscillation generator into the patient receiving region;

capturing overview magnetic resonance (MR) image data from the examination object; and selecting an examination region for transverse slices covering at least a subregion of the liver for a recording of MRE image data based upon the overview MR image data.

2. The method as claimed in claim 1, wherein the selection of the examination region is based upon an one or more of (i) exclusion of a lung from the examination region, or (ii) coverage of a transverse plane of the liver with a maximum spatial extent parallel to a transverse axis of the examination object.

3. The method as claimed in claim 1, wherein the selection of the examination region is based upon landmarks.

4. The method as claimed in claim 1, wherein the selection of the examination region is based upon a first trained function.

5. The method as claimed in claim 4, further comprising:
providing a second trained function,
wherein the determination of the position of the liver is based upon the second trained function.

6. The method as claimed in claim 1,
wherein the magnetic resonance device comprises a marking apparatus and a patient positioning apparatus for supporting a positioning of the examination object in the patient receiving region, the examination object being arranged on the patient positioning apparatus at least partially outside the patient receiving region during the photographic recording, and
wherein the providing the information item comprises a visualization of the position of the liver and/or the target position of the oscillation generator by marking the position of the liver and/or the target position of the oscillation generator on a body surface of the examination object via the marking apparatus.

7. The method as claimed in claim 1, wherein the generating the photographic recording comprises generating the photographic recording via a 3D camera.

8. The method as claimed in claim 1, wherein the generating the photographic recording comprises generating the photographic recording in a time-resolved manner.

9. The method as claimed in claim 1, wherein the magnetic resonance device comprises a display unit, and
wherein the providing the information item comprises providing a representation of the photographic recording and a representation of the target position of the oscillation generator on the display unit.

10. The method according to claim 9, wherein the representation of the photographic recording comprises a visualization in at least two viewing directions.

11. The method as claimed in claim 1, further comprising:
determining a comparison result by analyzing the overview MR image data regarding a position of the oscillation generator relative to the liver of the examination object; and
outputting a notification regarding repositioning of the oscillation generator based upon the comparison result.

12. The method as claimed in claim 11, wherein the determining the comparison result comprises determining a difference in a position of the oscillation generator and a position of the liver in a longitudinal direction, and
wherein the outputting the notification comprises a length indication for a displacement of the oscillation generator in the longitudinal direction.

13. The method as claimed in claim 1, further comprising:
performing the MR elastography by recording of the MRE image data of the examination region and a temporally matched actuation of the oscillation generator.

14. A magnetic resonance elastography (MRE) apparatus, comprising:
an oscillation generator configured to generate mechanical waves;
a magnetic resonance device configured to generate overview magnetic resonance (MR) image data and MRE image data;
a camera configured to generate a photographic recording; and
a determining unit configured to determine a position of a liver based upon the photographic recording;
a providing unit configured to provide an information item regarding a target position of the oscillation generator; and
a selecting unit configured to select an examination region for transverse slices covering at least a subregion of the liver for a recording MRE image data based upon the overview MR image data.

* * * * *